(12) United States Patent
Fu et al.

(10) Patent No.: US 9,104,822 B2
(45) Date of Patent: Aug. 11, 2015

(54) SIGNAL TRANSMISSION METHOD FOR USB INTERFACE AND APPARATUS THEREOF

(71) Applicants: Jiaxi Fu, Anhui (CN); Hui Bian, Anhui (CN); Shengquan Hu, Anhui (CN); Lianliang Tai, Anhui (CN); Feng Chen, Anhui (CN); Chaoqun Chu, Anhui (CN); Qingwei Liu, Anhui (CN); Guangren Li, Anhui (CN)

(72) Inventors: Jiaxi Fu, Anhui (CN); Hui Bian, Anhui (CN); Shengquan Hu, Anhui (CN); Lianliang Tai, Anhui (CN); Feng Chen, Anhui (CN); Chaoqun Chu, Anhui (CN); Qingwei Liu, Anhui (CN); Guangren Li, Anhui (CN)

(73) Assignee: LONTIUM SEMICONDUCTOR CORPORATION (CN)

( * ) Notice: Subject to any disclaimer, the term of this patent is extended or adjusted under 35 U.S.C. 154(b) by 219 days.

(21) Appl. No.: 13/761,323

(22) Filed: Feb. 7, 2013

(65) Prior Publication Data

US 2014/0075070 A1 Mar. 13, 2014

(30) Foreign Application Priority Data

Sep. 11, 2012 (CN) .......................... 2012 1 0355946
Dec. 31, 2012 (CN) .......................... 2012 1 0591694

(51) Int. Cl.
*G06F 13/40* (2006.01)
*G06F 1/12* (2006.01)
*H04L 7/06* (2006.01)
*G06F 13/42* (2006.01)

(52) U.S. Cl.
CPC .............. *G06F 13/4295* (2013.01); *G06F 1/12* (2013.01); *G06F 13/4045* (2013.01); *G06F 13/4282* (2013.01); *H04L 7/06* (2013.01); *G06F 2213/0042* (2013.01); *G06F 2221/2101* (2013.01)

(58) Field of Classification Search
CPC .... G06F 13/4282; G06F 13/4295; G06F 1/12; G06F 2213/0042; H04L 7/06
USPC ........................................................ 710/106
See application file for complete search history.

(56) References Cited

U.S. PATENT DOCUMENTS

| 6,526,468 | B1 * | 2/2003 | Larochelle et al. ........... 710/305 |
| 7,028,133 | B1 * | 4/2006 | Jackson ......................... 710/313 |
| 7,149,833 | B2 * | 12/2006 | McLeod ......................... 710/300 |
| 7,177,973 | B2 * | 2/2007 | Jackson ......................... 710/313 |
| 7,334,072 | B1 * | 2/2008 | Wright .......................... 710/315 |
| 7,395,366 | B1 * | 7/2008 | Wright .......................... 710/315 |

(Continued)

OTHER PUBLICATIONS

Taiwanese 1st Office Action corresponding to Application No. 10420257920; Date of Issuance: Feb. 26, 2015.

*Primary Examiner* — Ryan Stiglic
(74) *Attorney, Agent, or Firm* — Cantor Colburn LLP

(57) ABSTRACT

A signal transmission method for a USB interface and an apparatus thereof are provided. The method includes: receiving a first USB signal sent from a sending terminal, processing the first USB signal into a USB-like signal, and transmitting the USB-like signal via a networking cable; receiving the USB-like signal, processing the USB-like signal into a second USB signal, and sending the second USB signal to a receiving terminal. According to the embodiments of the present invention, the first USB signal is processed into a USB-like signal which is similar to the USB signal, the USB-like signal is transmitted via a networking cable, and the USB-like signal is processed into a second USB signal. The transmission process does not require converting the USB signal into a networking-cable signal which is to be transmitted via a networking cable, thereby avoiding conversion between protocols, and simplifying the entire transmission process.

17 Claims, 7 Drawing Sheets

(56) References Cited

U.S. PATENT DOCUMENTS

| | | | |
|---|---|---|---|
| 7,418,524 B2* | 8/2008 | Beasley et al. | 710/2 |
| 7,587,536 B2* | 9/2009 | McLeod | 710/65 |
| 7,647,446 B2* | 1/2010 | Okuma | 710/313 |
| 7,761,646 B2* | 7/2010 | Okuma | 710/313 |
| 7,818,486 B2* | 10/2010 | McLeod | 710/313 |
| 8,856,388 B2* | 10/2014 | McLeod | 710/2 |
| 8,868,792 B2* | 10/2014 | Schultz et al. | 710/2 |
| 2002/0010821 A1* | 1/2002 | Yu et al. | 710/100 |
| 2003/0177294 A1* | 9/2003 | Russell | 710/62 |
| 2004/0177197 A1* | 9/2004 | McLeod | 710/300 |
| 2004/0205276 A1* | 10/2004 | Ferguson | 710/305 |
| 2005/0033877 A1* | 2/2005 | McLeod | 710/33 |
| 2006/0020736 A1* | 1/2006 | Jackson | 710/313 |
| 2008/0028120 A1* | 1/2008 | McLeod | 710/313 |
| 2008/0082717 A1* | 4/2008 | Okuma | 710/313 |
| 2010/0042767 A1* | 2/2010 | McLeod | 710/300 |
| 2010/0281197 A1 | 11/2010 | Leydier et al. | |
| 2012/0117292 A1* | 5/2012 | Lida et al. | 710/313 |
| 2012/0117293 A1* | 5/2012 | Salamon et al. | 710/313 |
| 2014/0211862 A1* | 7/2014 | Moghe et al. | 375/256 |

* cited by examiner

SIGNAL TRANSMISSION METHOD FOR USB INTERFACE AND APPARATUS THEREOF

This application claims the benefit of Chinese patent application No. 201210355946.0 filed on Sep. 11, 2012, and the benefit of Chinese patent application No. 201210591694.1 filed on Dec. 31, 2012. Both applications are incorporated herein by reference in their entireties.

FIELD OF THE INVENTION

The present invention relates to the field of CMOS integrated circuit technologies, and in particular to a signal transmission method for a USB interface, and an apparatus thereof.

BACKGROUND OF THE INVENTION

Currently, USB (Universal Serial Bus) is a common interface technology which has a wide range of applications in daily life, e.g., USB flash drive, connecting a mouse or keyboard to a PC, USB removable disk. USB specifications include: USB 1.1, USB 2.0 and USB 3.0. USB 1.1 supports Low Speed (1.5 Mb/s) and Full Speed (12 Mb/s); USB 2.0 supports High Speed (480 Mb/s); and USB 3.0 supports Super Speed (5 Gb/s). Transmission cables for the USB interface are generally short and do not meet the requirements in certain application scenarios. For example, when a USB printer is not in the same place as the host (e.g., a computer) and is connected to the host via a USB transmission cable, the printer cannot work normally if the distance from the host is greater than 5 m. Moreover, in an application where the KVM (keyboard, video and mouse) and the host are not in the same place (for security or other reasons), the user can only operate the host through the KVM, which requires long-distance transmission of the USB signal. In security systems, long-distance transmission is also required for USB cameras.

Therefore, as technology develops, it is desirable to achieve long-distance transmission for the USB interface. Currently, signal transmission for a USB interface with a long transmission cable is achieved by: converting the USB signal into a networking-cable signal; transmitting the networking-cable signal by a networking cable; and converting the networking-cable signal into a USB signal. However, since transmission protocols in USB and networking cables are different, when the conventional method above is used, complex conversions from a USB signal to a networking-cable signal and from the networking-cable signal to a USB signal are required, which makes the signal transmission process cumbersome.

SUMMARY OF THE INVENTION

In view of this, an object of the present invention is to provide a USB signal transmission method with a simple transmission process.

In order to achieve the above object, an embodiment of the present invention provides a signal transmission method for a USB interface, including:

receiving a first USB signal sent from a sending terminal, processing the first USB signal into a USB-like signal, and transmitting the USB-like signal via a networking cable; and receiving the USB-like signal, processing the USB-like signal into a second USB signal, and sending the second USB signal to a receiving terminal, wherein the USB-like signal is a pair of differential signals that meets a USB transmission protocol, does not meet USB signal electrical specifications, and has a signal swing different from those of the first USB signal and the second USB signal.

Preferably, the transmitting the USB-like signal via a networking cable includes: transmitting the USB-like signal by a pair of wires in the networking cable, with at least one of the rest of wires in the networking cable used for ground.

Preferably, the method further includes: using at least one of the rest of wires in the networking cable for power supply.

Preferably, before the processing the first USB signal into a USB-like signal, the method further includes: obtaining a squelch signal according to the first USB signal; and the transmitting the USB-like signal via a networking cable includes: transmitting the USB-like signal by a first pair of wires in the networking cable, and transmitting the squelch signal by a second pair of wires in the networking cable, with at least one of the rest of wires in the networking cable used for ground.

Preferably, the method further includes:
using at least one of the rest of wires in the networking cable for power supply.

Preferably, the method further includes:
transmitting a control signal by at least one of the rest of wires in the networking cable.

Preferably, the processing the first USB signal into a USB-like signal includes:

abstracting a first clock according to a data edge of the first USB signal;

sampling the first USB signal and the squelch signal according to the first clock to obtain a processed first USB signal and a processed squelch signal, and sending the processed first USB signal and the processed squelch signal;

receiving the processed first USB signal and the processed squelch signal, and sending the processed first USB signal and the processed squelch signal to a first-in first-out (FIFO) unit by using the first clock;

receiving a second clock sent from a phase-locked loop (PLL), the second clock having a frequency different from that of the first clock;

reading the processed first USB signal and the processed squelch signal from the FIFO unit by using the second clock;

sending the processed first USB signal and the processed squelch signal read from the FIFO unit; and receiving the processed first USB signal and the processed squelch signal read from the FIFO unit, and processing the processed first USB signal and the processed squelch signal read from the FIFO unit into the USB-like signal.

Preferably, before the transmitting the USB-like signal via a networking cable, the method further includes: increasing the amplitude of the USB-like signal at a data edge of the USB-like signal.

Preferably, while receiving the USB-like signal, the method further includes: performing equalization on the USB-like signal.

Accordingly, an embodiment of the present invention provides a signal transmission apparatus for a USB interface, including:

a first processing module, adapted to receive a first USB signal sent from a sending terminal, process the first USB signal into a USB-like signal, and transmit the USB-like signal via a networking cable; and a second processing module, adapted to receive the USB-like signal, process the USB-like signal into a second USB signal, and send the second USB signal to a receiving terminal, wherein the USB-like signal is a pair of differential signals that meets a USB transmission protocol, does not meet USB signal electrical specifications, and has a signal swing different from those of the first USB signal and the second USB signal.

Preferably, the first processing module is adapted to transmit the USB-like signal by a pair of wires in the networking cable, with at least one of the rest of wires in the networking cable used for ground.

Preferably, the first processing module is further adapted to use at least one of the rest of wires in the networking cable for power supply.

Preferably, the first processing module is further adapted to obtain a squelch signal according to the first USB signal;

the first processing module is adapted to: transmit the USB-like signal by a first pair of wires in the networking cable, and transmit the squelch signal by a second pair of wires in the networking cable, with at least one of the rest of wires in the networking cable used for ground.

Preferably, the first processing module is further adapted to use at least one of the rest of wires in the networking cable for power supply.

Preferably, the first processing module is further adapted to transmit a control signal by at least one of the rest of wires in the networking cable.

Preferably, the first processing module includes:

an extraction unit, adapted to extract a first clock according to a data edge of the first USB signal;

a sampling unit, adapted to sample the first USB signal and the squelch signal according to the first clock to obtain a processed first USB signal and a processed squelch signal, and send the processed first USB signal and the processed squelch signal;

a first receiving unit, adapted to receive the processed first USB signal and the processed squelch signal, and send the processed first USB signal and the processed squelch signal to a FIFO unit by using the first clock;

a second receiving unit, adapted to receive a second clock sent from a PLL, the second clock having a frequency different from that of the first clock;

a reading unit, adapted to read the processed first USB signal and the processed squelch signal from the FIFO unit by using the second clock;

a sending unit, adapted to send the processed first USB signal and the processed squelch signal read from the FIFO unit; and a third receiving unit, adapted to receive the processed first USB signal and the processed squelch signal read from the FIFO unit, and process the processed first USB signal and the processed squelch signal read from the FIFO unit into the USB-like signal.

Preferably, the first processing module further includes:

an amplitude increasing unit, adapted to increase the amplitude of the USB-like signal at a data edge of the USB-like signal.

Preferably, the second processing module further includes:

an equalization unit, adapted to perform equalization on the USB-like signal.

According to the embodiments of the present invention, the first USB signal is processed into the USB-like signal that meets a USB transmission protocol, does not meet USB signal electrical specifications, and has a signal swing different from those of USB signals; the USB-like signal is transmitted via the networking cable; and then the USB-like signal is processed into the second USB signal. The transmission process does not require converting the USB signal into a networking-cable signal, thereby avoiding conversions between the transmission protocols in USB and the networking cable, and simplifying the entire transmission process.

BRIEF DESCRIPTION OF THE DRAWINGS

For a better understanding of the technical solutions in the embodiments of the present invention and in the prior art, accompanying drawings used in description are briefly described below. Clearly, these drawings are merely some embodiments of the present invention, and those skilled in the art can obtain other drawings from these drawings without inventive effort.

DETAILED DESCRIPTION OF THE INVENTION

The objects, technical solutions and advantages of the embodiments of the present invention will become clearer when read in conjunction with the descriptions below and the accompanying drawings. Clearly, the embodiments described herein are merely some embodiments of the present invention. Any other embodiment obtained by those skilled in the art based on the embodiments described herein without inventive effort falls within the scope of protection of the present invention.

An embodiment of the present invention provides a signal transmission method for a USB interface. A specific embodiment of the signal transmission method is described below in detail.

Embodiment 1

Figure 1:
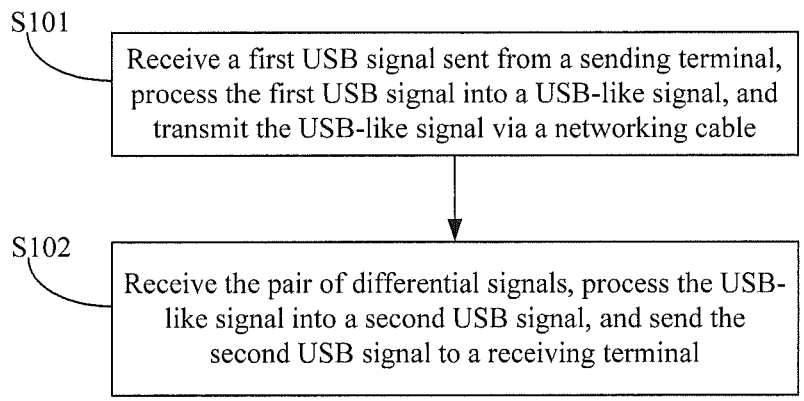
FIG. 1 is a flow chart of a signal transmission method for a USB interface according to Embodiment 1 of the present invention.

Embodiment 1 of the present invention provides a signal transmission method for a USB interface. FIG. 1 shows a flow chart of the signal transmission method, including the following steps.

Step S101: receiving a first USB signal, processing the first USB signal into a USB-like signal, and transmitting the USB-like signal via a networking cable. Specifically, the first USB signal is sent from a sending terminal. The sending terminal may be a PC HOST, a HUB, etc. The "USB-like signal" in this embodiment of the present invention is a pair of differential signals that meets a USB transmission protocol, does not meet USB signal electrical specifications, and has a signal swing different from those of the first USB signal and the second USB signal, i.e., the "USB-like signal" is a pair of differential signals that is similar to a USB signal.

In this step, the first USB signal is converted into the USB-like signal which is similar to the USB signal, eliminating the need to convert the first USB signal into a networking-cable signal. The USB-like signal can be transmitted via a networking cable, e.g., CAT5e, CAT6.

Step S102: receiving the USB-like signal, converting the USB-like signal into a second USB signal, and sending the second USB signal to a receiving terminal (DEVICE end).

After the transmission by step S101 and step S102, ideally, there is no signal loss, i.e., the first USB signal and the second USB signal are the same. However, under normal circumstances, some synchronization signal in the data packets may be lost after the transmission, which does not affect normal transmission of the USB signal, i.e., the first USB signal and the second USB signal are different. The "first USB signal" and the "second USB signal" in the embodiment of the present invention may include both cases, i.e., the "first USB signal" and the "second USB signal" in the embodiment of the present invention may be the same or may be different. But they both are USB signals, and meet a USB transmission protocol and USB signal electrical specifications.

Figure 2:
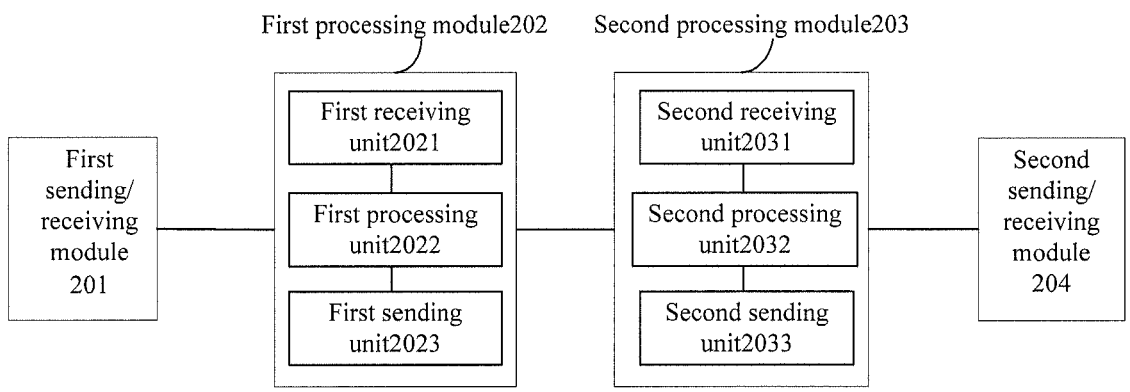
FIG. 2 is a structural diagram illustrating a signal transmission apparatus for a USB interface according to Embodiment 1 of the present invention.

Accordingly, Embodiment 1 of the present invention also provides a signal transmission apparatus for a USB interface. FIG. 2 shows a structural diagram of the signal transmission apparatus, including: a first sending/receiving module 201, a first processing module 202, a second processing module 203, and a second sending/receiving module 204.

The first sending/receiving module 201 is adapted to send a first USB signal. The first sending/receiving module 201 may be a USB interface on a PC or server (HOST).

The first processing module 202 is adapted to receive the first USB signal sent from the first sending/receiving unit 201, process the first USB signal into a USB-like signal, and transmit the USB-like signal to the second processing module 203 via a networking cable. The first processing module 202 may be an extender chip repeater.

The second processing module 203 is adapted to receive the USB-like signal sent from the first processing module 202, process the USB-like signal into a second USB signal, and send the second USB signal to the second sending/receiving module 204. That is, the transmission between the sending/receiving unit 201 and the first processing module 202 is by a USB cable, the transmission between the first processing module 202 and the second processing module 203 is by a networking cable, and the transmission between the second processing module 203 and the second sending/receiving unit 204 is by a USB cable. The second processing module 203 may also be an extender chip.

The second sending/receiving module 204 is adapted to receive the second USB signal sent from the second processing module 203. The second sending/receiving module 204 may be a USB interface on a device (DEVICE), e.g., a USB interface on a USB flash drive, mouse, keyboard, etc. Specifically, the first processing module 202 may include:

a first receiving unit 2021, adapted to receive the first USB signal sent from the first sending/receiving module 201;

a first processing unit 2022, adapted to process the first USB signal received by the first receiving unit 2021 into a USB-like signal that meets a USB transmission protocol, does not meet USB signal electrical specifications, and has a signal swing different from those of the first USB signal and the second USB signal; and a first sending unit 2023, adapted to send, via a networking cable, the USB-like signal produced by the first processing unit 2022.

The second processing module 203 may include:

a second receiving unit 2031, adapted to receive the USB-like signal sent from the first sending unit 2023 in the first processing module 202;

a second processing unit 2032, adapted to process the USB-like signal received by the second receiving unit 2031 into a second USB signal; and a second sending unit 2033, adapted to send the second USB signal produced by the second processing unit 2032 to the second sending/receiving module 204.

It is noted that the above units may exist independently, or two or more of them may be combined to form a component. Any apparatus that can carry out the functions of the above units falls within the scope of protection of the present invention.

Figure 3:
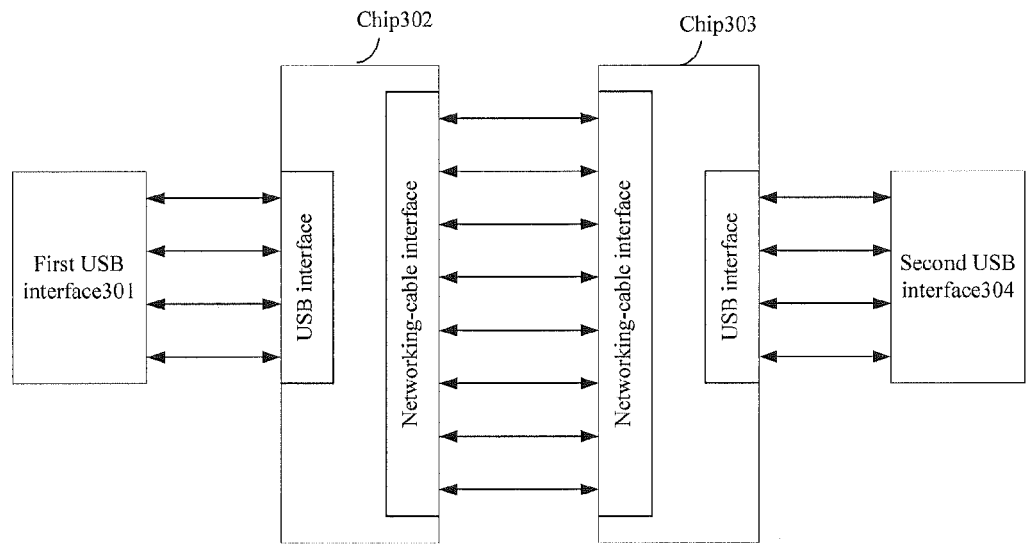
FIG. 3 is a structural diagram illustrating a signal transmission apparatus for a USB interface according to an example of Embodiment 1 of the present invention.

FIG. 3 is a structural diagram illustrating a signal transmission apparatus according to an example of Embodiment 1 of the present invention. Specifically, the first USB interface 301 may be a USB interface on a computer (HOST), the second USB interface 304 may be a USB interface on a USB flash drive or removable disk (DEVICE), the chip 302 may be an extender chip close to the computer host side, and the chip 303 may be an extender chip close to the USB flash drive or removable disk side. The chip 302 and the chip 303 may be of the same type. That is, the interface between the first USB interface 301 and the chip 302 is a USB interface, the interface between the chip 303 and the second USB interface 304 is also a USB interface, and the interface between the chip 302 and the chip 303 is a networking-cable interface.

The signals transmitted between the first USB interface 301 and the chip 302 and between the chip 303 and the second USB interface 304 are USB signals, which meet a USB transmission protocol and USB signal electrical specifications, and are transmitted using USB cables. The signal transmitted between the chip 302 and the chip 303 is the USB-like signal which is similar to the USB signal. That is, the signal transmitted between the chip 302 and the chip 303 meets a USB transmission protocol but does not meet USB signal electrical specifications, and is transmitted using a networking cable, i.e., the USB-like signal which is similar to the USB signal is transmitted using a networking cable.

In this case, the chip 302 may perform the functions of the first receiving unit 2021, the first processing unit 2022 and the first sending unit 2023 shown in FIG. 2, and the chip 303 may perform the functions of the second receiving unit 2031, the second processing unit 2032 and the second sending unit 2033 shown in FIG. 2.

According to the embodiment of the invention, the first USB signal is processed into the USB-like signal that meets a USB transmission protocol, does not meet USB signal electrical specifications, and has a signal swing different from those of USB signals; the USB-like signal is transmitted via the networking cable; and then the USB-like signal is processed into the second USB signal. The transmission process does not require converting the USB signal into a networking-cable signal, thereby avoiding conversions between the transmission protocols in USB and the networking cable, and simplifying the entire transmission process.

It is noted that the signal transmission method for a USB interface according to Embodiment 1 of the present invention is applicable to the cases including Low Speed, Full Speed and High Speed. However, the corresponding signal transmission method and signal transmission apparatus would be different, which will be described in detail hereinafter.

Embodiment 2

Embodiment 2 of the present invention provides a signal transmission method for a USB interface, which is mainly applicable to Low Speed or Full Speed.

Figure 4:
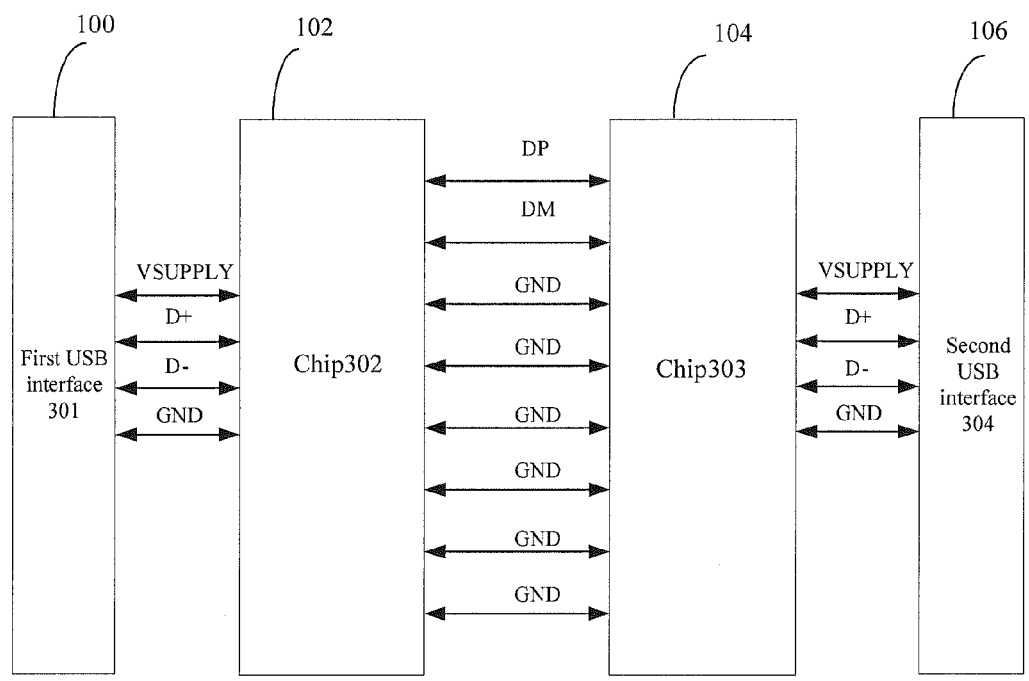
FIG. 4 and FIG. 5 are structural diagrams illustrating a signal transmission apparatus for a USB interface according to Embodiment 2 of the present invention.

The signal transmission method in Embodiment 2 of the present invention is similar to that in Embodiment 1 of the present invention, except that: the signal transmission method in Embodiment 2 of the present invention transmits the USB-like signal using a pair of wires in the networking cable, with at least one of the rest of wires in the networking cable for ground. Reference is made to FIG. 4, which illustrates the transmission process of a signal transmission apparatus that corresponds to the signal transmission method.

The interface between the first USB interface 301 and the chip 302 and the interface between the chip 303 and the second USB interface 304 are USB interfaces; the interface between the chip 302 and the chip 303 is a networking-cable interface. Therefore, the signals between the first USB interface 301 and the chip 302 and the signal between the chip 303 and the second USB interface 304 are transmitted using USB cables, and the signal between the chip 302 and the chip 303 is transmitted using a networking cable.

The USB cable contains four signal wires, for power supply (VSUPPLY, 5V), ground (GND), and the USB signal (D+ and D−), respectively. The networking cable contains eight wires (four pairs). In Low-Speed or Full-Speed USB signal transmission, a pair of wires (e.g., DP and DM shown in FIG. 4) in the networking cable is used to transmit the USB-like signal, and at least one of the other six wires is used for ground. That is, the Low-Speed or Full-Speed USB signal transmission process in the networking cable may have the following cases:

(1) a pair of wires (e.g., DP and DM) in the networking cable is used to transmit the USB-like signal, a wire in the networking cable is used for power supply, and one or more wires of the rest of wires in the networking cable are used for ground;

(2) a pair of wires (e.g., DP and DM) in the networking cable is used to transmit the USB-like signal, a wire in the networking cable is used for ground, a wire in the networking cable is used for power supply, and the rest of wires in the networking cable are used as control signal wires for controlling components in the chip 302 or 303;

(3) a pair of wires (e.g., DP and DM) in the networking cable is used to transmit the USB-like signal, and the rest of wires in the networking cable are used for ground (as shown in FIG. 4);

Clearly, the signal transmission method in the networking cable is not limited to the above cases (1) to (3). However, in Embodiment 2, it is preferred that: a pair of wires in the networking cable is used to transmit the USB-like signal, and at least one wire in the networking cable is used for ground.

Signals transmitted in the differential wires D+ and D−, which are used for transmitting data, meet USB 2.0 signal electrical specifications. The differential wires DP and DM are used for transmitting USB data, but the signals transmitted in the differential wires DP and DM do not meet USB 2.0 signal electrical specifications.

Figure 5:
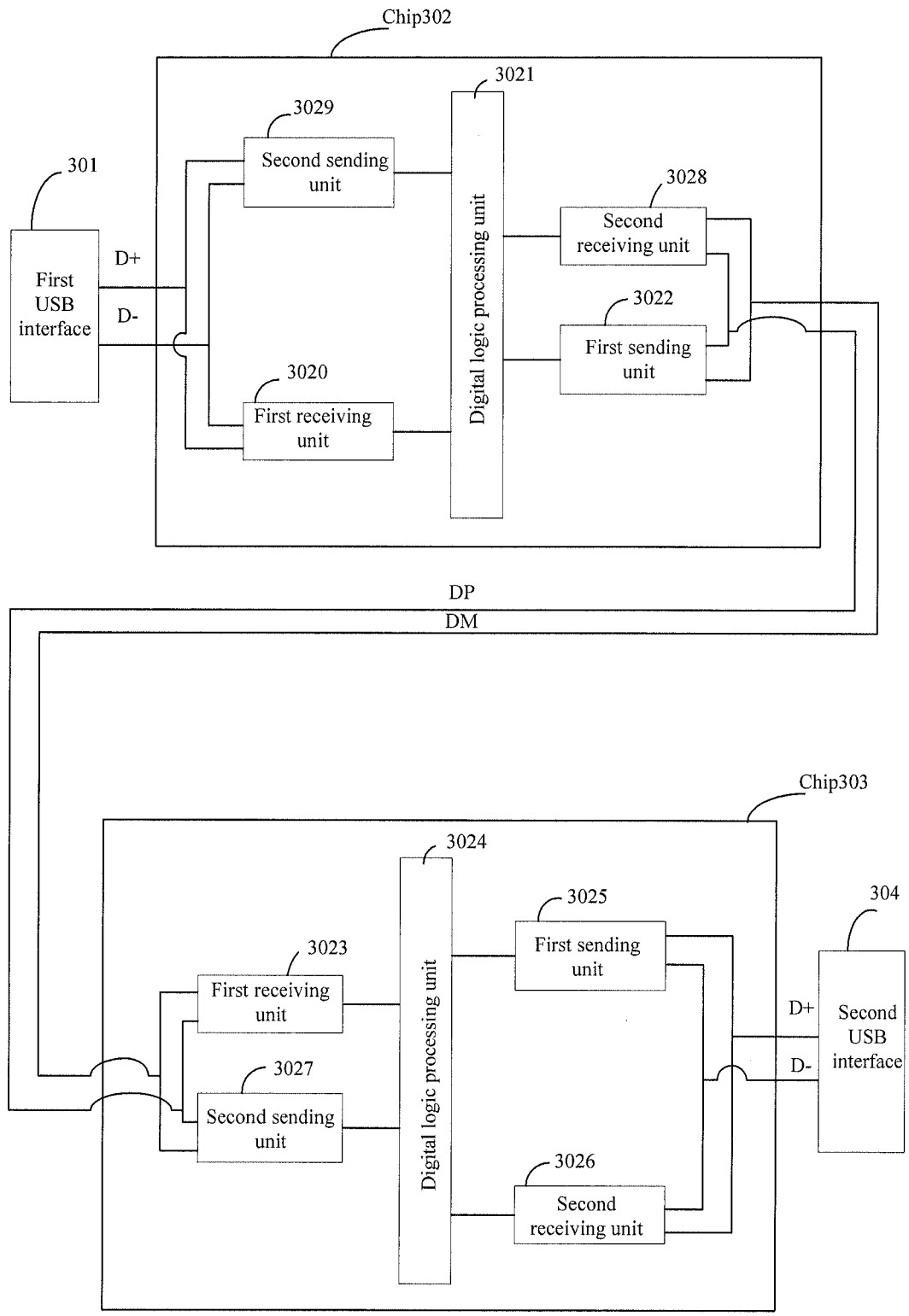

The signal transmission method for a USB interface in the case of Low Speed or Full Speed is described in detail in conjunction with FIG. 5, including the following steps.

A, a first USB interface 301 sends a first USB signal, e.g., via a pair of differential wires D+ and D−;

B, a first receiving unit 3020 in a chip 302 receives the first USB signal, and transmits the first USB signal to a digital logic processing unit (Core Logic Module) 3021;

C, the digital logic processing unit 3021 in the chip 302 sends the first USB signal to a first sending unit 3022;

D, the first sending unit 3022 in the chip 302 processes the received first USB signal into a USB-like signal, and transmits the USB-like signal to a chip 303 via a networking cable, e.g., via a pair of wires DP and DM in the networking cable;

It can be seen that, the first sending unit 3022 in the chip 302 shown in FIG. 5 can carry out the functions of the first processing unit 2022 and the first sending unit 2023 shown in FIG. 2.

The digital logic processing units 3021 and 3024 in this embodiment may be used solely for the sending of data, and data processed by the digital logic processing units 3021 and 3024 are full-signal swing data.

E, a first receiving unit 3023 in a chip 303 receives the USB-like signal sent from the first sending unit 3022 in the chip 302, and sends the USB-like signal to a digital logic processing unit 3024 in the chip 303;

F, the digital logic processing unit 3024 in the chip 303 sends the USB-like signal received by the first receiving unit 3023 in the chip 303 to a first sending unit 3025 in the chip 303;

G, the first sending unit 3025 in the chip 303 processes the received USB-like signal into a second USB signal, and sends the second USB signal to a second USB interface 304, e.g., via a pair of differential wires D+ and D− (ideally, the second USB signal is the same as the first USB signal);

It can be seen that, the first sending unit 3025 in the chip 303 shown in FIG. 5 can carry out the functions of the second processing unit 2032 and the second sending unit 2033 shown in FIG. 2.

It is noted that, the transmission of the USB signal between the first USB interface 301 and the second USB interface 304 may be two-way. That is, the USB signal can be transmitted from the first USB interface 301 to the second USB interface 304, as well as from the second USB interface 304 to the first USB interface 301. However, at a given moment, a USB signal between the first USB interface 301 and the second USB interface 304 is transmitted in one direction. For a USB signal to be transmitted from the second USB interface 304 to the first USB interface 301, the following steps may be performed:

A', the second USB interface 304 sends a second USB signal, e.g., via a pair of differential wires D+ and D−;

B', the second receiving unit 3026 in the chip 303 receives the second USB signal, and sends the second USB signal to the digital logic processing unit 3024;

C', the digital logic processing unit 3024 in the chip 303 sends the second USB signal to the second sending unit 3027;

D', the second sending unit 3027 in the chip 303 processes the received second USB signals into a USB signal, and transmits the USB-like signal to the chip 302 via the networking cable, e.g., via a pair of wires (DP and DM) in the networking cable;

E', the second receiving unit 3028 in the chip 302 receives the USB-like signal sent from the second sending unit 3027 in the chip 303;

F', the digital logic processing unit 3021 in the chip 302 sends the USB-like signal received by the second receiving unit 3028 in the chip 302 to the second sending unit 3029 in the chip 302;

G', the second sending unit 3029 in the chip 302 processes the received USB-like signal into a first USB signal, and sends the first USB signal to the first USB interface 301, e.g., via a pair of differential wires D+ and D− (ideally, the second USB signal is the same as the first USB signal).

As can be seen from the above, the chip 302 and the chip 303 shown in FIG. 5 are equivalent to the first processing module 202 and the second processing module 203, respectively. In addition, the chip 302 and the chip 303 may be of the same type, and can carry out the same function.

The signal transmission process for a USB interface in the case of Low Speed or Full Speed is described above. The signal transmission method for a USB interface according to the embodiment of the present invention is applicable to High Speed.

Embodiment 3

Figure 6:
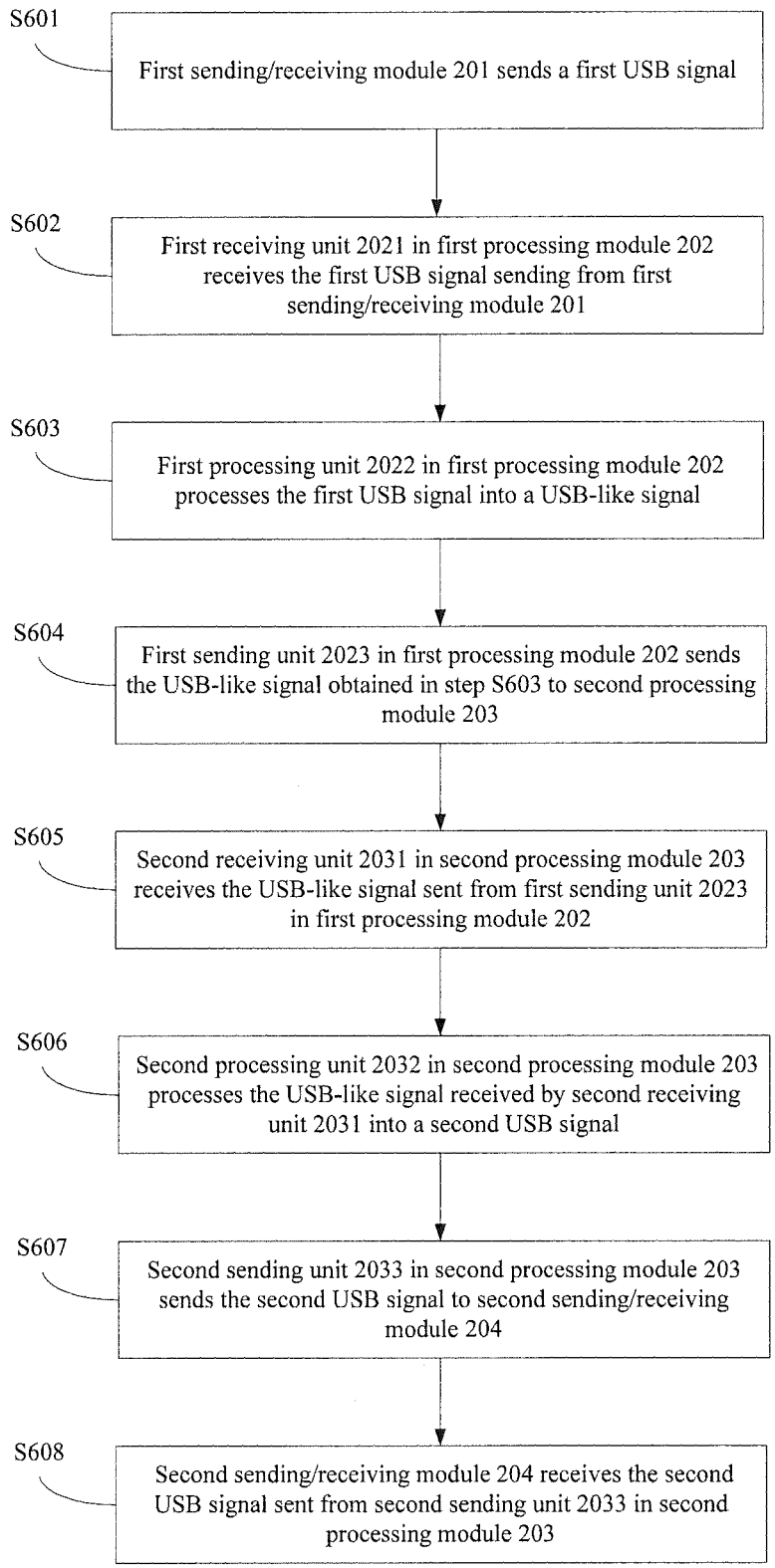
FIG. 6 is a flow chart of a signal transmission method for a USB interface according to Embodiment 3 of the present invention.
Figure 7:
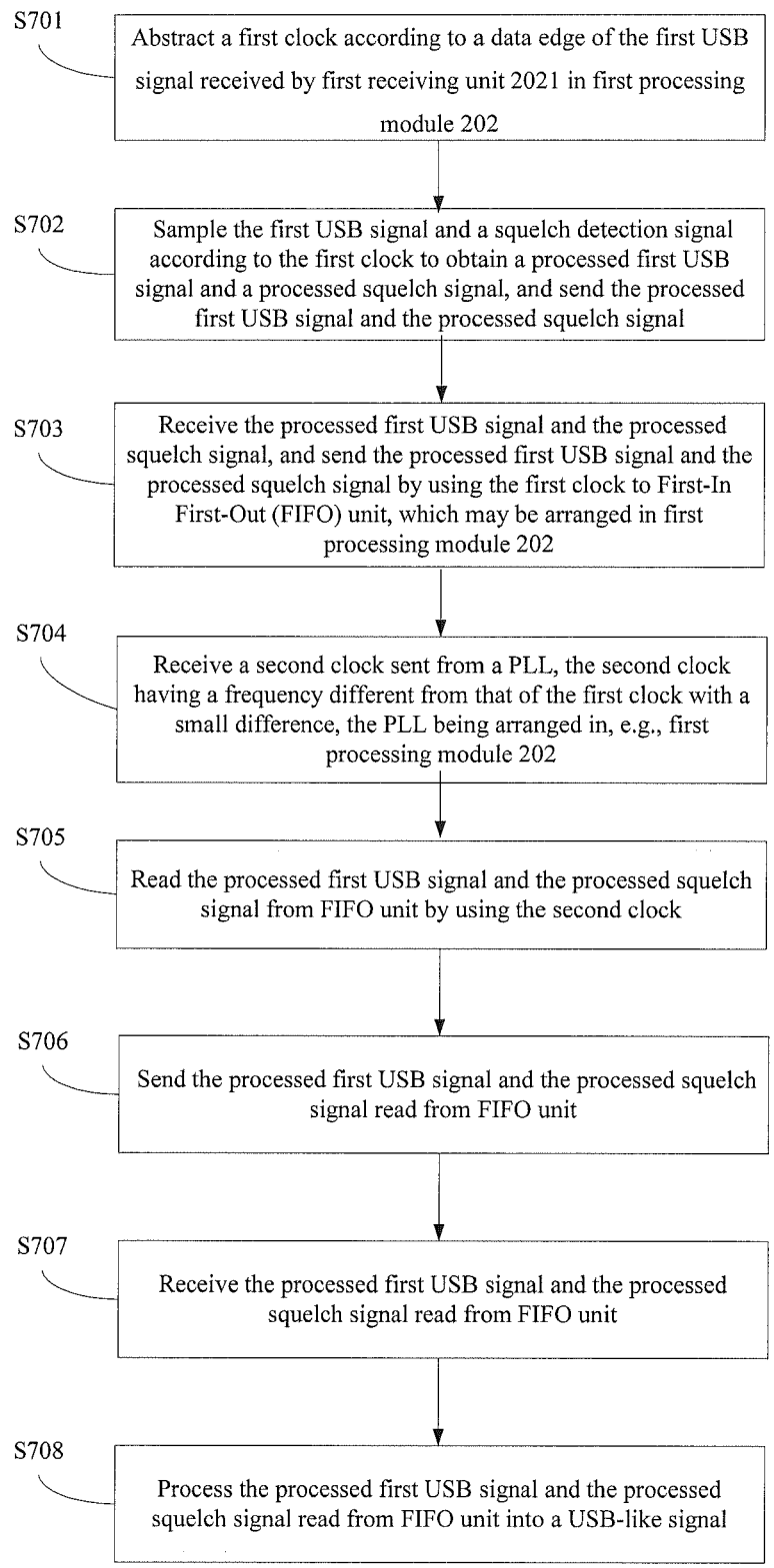
FIG. 7 is a flow chart illustrating processing a first USB signal into a USB-like signal according to an example of Embodiment 3 of the present invention.

FIG. 6 is a flow chart of a signal transmission method for a USB interface according to Embodiment 3 of the present invention. In conjunction with FIG. 2, FIG. 7, FIG. 8(a) and FIG. 8(b), the signal transmission method includes the following steps.

Figure 8A:
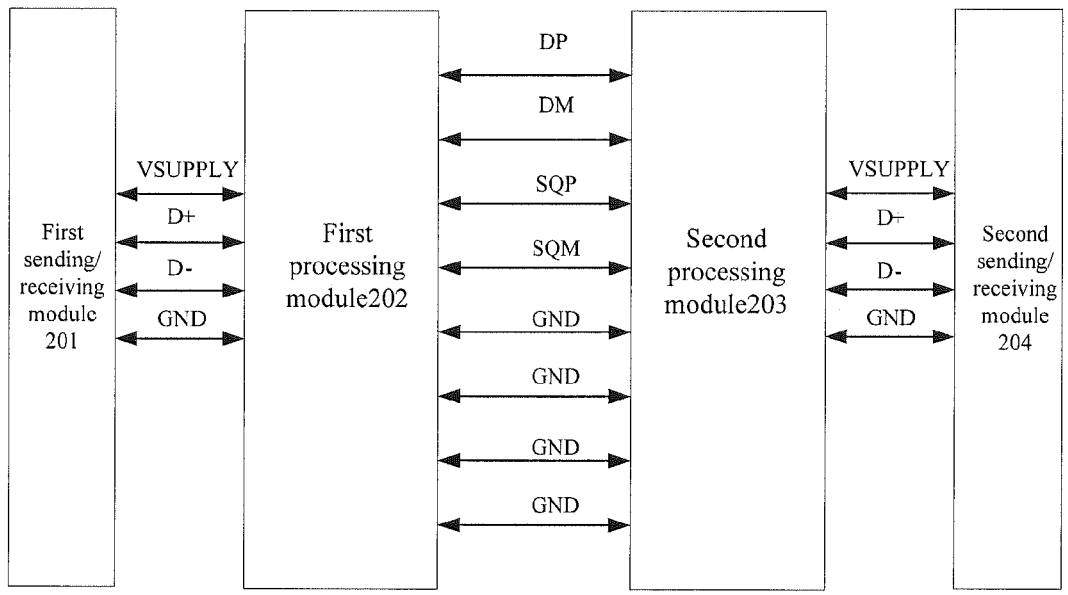
FIGS. 8(a), 8(b), and FIG. 9 are structural diagrams illustrating a signal transmission apparatus for a USB interface according to Embodiment 3 of the present invention.

Step S601: a first sending/receiving module 201 sends a first USB signal, e.g., via a pair of differential wires D+ and D− in the USB cable shown in FIG. 8(a). In addition, the USB cable may also include a power supply signal wire (VSUPPLY, 5V) and a ground wire (GND). The signals transmitted in the pair of differential wires D+ and D meet USB 2.0 signal electrical specifications.

Step S602: the first receiving unit 2021 in the first processing module 202 receives the first USB signal sent from the first sending/receiving module 201.

Step S603: the first processing unit 2022 in the first processing module 202 processes the first USB signal into a USB-like signal.

Before step S603, the following step may be performed: obtaining a squelch signal according to the first USB signal.

In the embodiment of the present invention, the squelch signal may be obtained from the first USB signal by:

determining the absolute value of the difference between D+ and D− of the first USB signal received by the first receiving unit 2021, and outputting "no squelch" (logic "0") if the absolute value of the difference between D+ and D− is greater than 150 mV; outputting "squelch" (logic "1") if the absolute value of the difference between D+ and D− is less than 100 mV. In the embodiment of the present invention, the squelch signal may be a pulse signal consisting of logic "0"s and logic "1"s. Specifically, this step may be implemented with a comparator.

It is noted that, step S603 may include the following steps.

Step S701: abstracting a first clock according to a data edge of the first USB signal received by the first receiving unit 2021 in the first processing module 202;

Step S702: sampling, according to the first clock, the first USB signal and the squelch signal received by the first receiving unit 2021 to obtain a processed first USB signal and a processed squelch signal, and sending the processed first USB signal and the processed squelch signal;

Step S703: receiving the processed first USB signal and the processed squelch signal, and sending the processed first USB single and the processed squelch signal by using the first clock to a FIFO unit, which may be arranged in the first processing module 202;

Step S704: receiving a second clock sent from a PLL, the second clock having a frequency slightly different from that of the first clock, the PLL being arranged in the first processing module 202;

Step S705: reading the processed first USB signal and the processed squelch signal from the FIFO unit by using the second clock;

Step S706: sending the processed first USB signal and the processed squelch signal read from the FIFO unit;

Step S707: receiving the processed first USB signal and the processed squelch signal read from the FIFO unit; and Step S708: processing the processed first USB signal and the processed squelch signal read from the FIFO unit into the USB-like signal.

Step S701 is for clock recovery, and steps S702 to S707 are for clock and data synchronization (clock and data synchronization here refers to writing data into a FIFO by using the clock recovered by a CDR, and reading the data from the FIFO by using a clock generated by a PLL). For the High-Speed USB signal data transmission, the clock recovered from data and the clock generated by the PLL for sending the data are different in frequency. Therefore, directly sending data by using a clock recovered from the data will result in significant jitter, which is undesirable to subsequent data receiving, clock recovery and data sampling. Accordingly, the clock and data synchronization step before the processing the first USB signal into a USB-like signal in the embodiment of the present invention can prevent data jitter, and is beneficial to subsequent data receiving, clock recovery and data sampling. In addition, the clock and data synchronization step may be implemented with a method known in the art, detailed description of which is omitted here.

Step S604: the first sending unit 2023 in the first processing module 202 sends the USB-like signal obtained in the step S603 to the second processing module 203.

In a specific example, the USB-like signal may be sent to the second processing module 203 according to the method shown in FIG. 8(a), i.e., a pair of wires (DP and DM) in the networking cable is used to transmit the USB-like signal, a pair of wires (SQP and SQM) in the networking cable is used to transmit the squelch signal, and at least one wire in the networking cable is used for ground. In the embodiment, the signal transmission in the networking cable may have the following cases:

(1) A pair of wires (DP and DM) in the networking cable is used to transmit the USB-like signal, a pair of wires (SQP and SQM) in the networking cable is used to transmit the squelch signal, and the rest of wires in the networking cable are used for ground.

(2) A pair of wires (DP and DM) in the networking cable is used to transmit the USB-like signal, a pair of wires (SQP and SQM) in the networking cable is used to transmit the squelch signal, one or two wires in the networking cable are used for power supply, and the rest of wires in the networking cable are used for ground. In this case, online power delivery can be achieved.

(3) A pair of wires (DP and DM) in the networking cable is used to transmit the USB-like signal, a pair of wires (SQP and SQM) in the networking cable is used to transmit the squelch signal, a wire in the networking cable is used for power supply, a wire in the networking cable is used as a control signal wire, and the rest of wires in the networking cable are used for ground.

Clearly, in addition to the above cases (1) to (3), the embodiment of the present invention may include other cases for the signal transmission in the networking cable, however, it is preferred that: a pair of wires (DP and DM) in the networking cable is used to transmit the USB-like signal, a pair of wires (SQP and SQM) in the networking cable is used to transmit the squelch signal, and at least one of the rest of wires in the networking cable is used for ground.

Figure 8B:
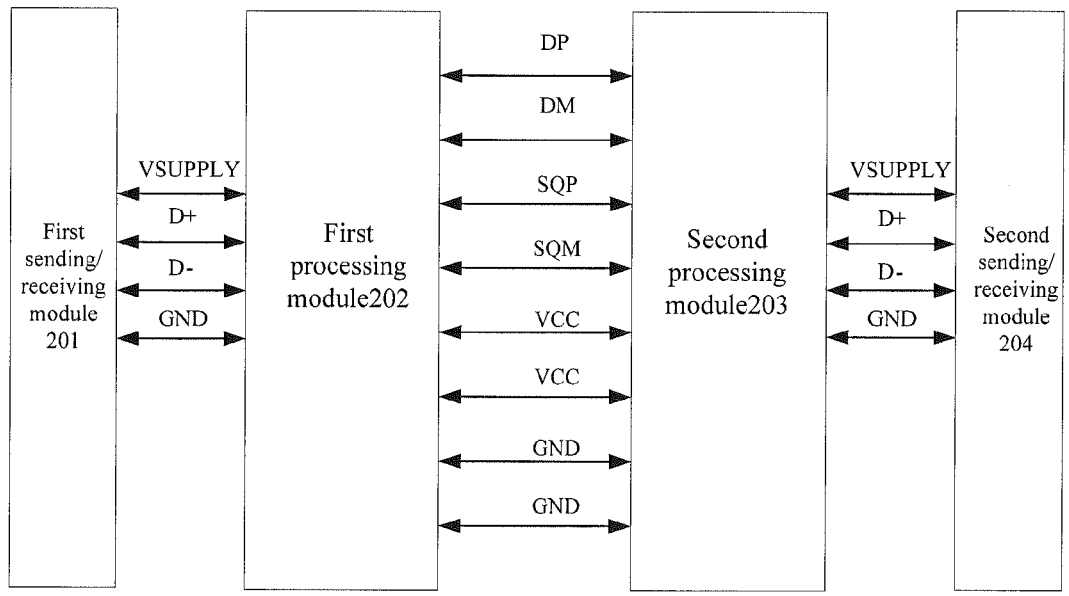

In the case where the networking cable includes a pair of wires for power supply and a pair of wires for ground, as shown in FIG. 8(b), online power delivery can be achieved for High-Speed USB signal transmission, which is impossible for the conventional signal transmission method where the USB signal is converted into a networking-cable signal according to the protocols. This online power delivery-enabled method can greatly reduce signal transmission costs.

Step S605: the second receiving unit 2031 in the second processing module 203 receives the USB-like signal sent from the first sending unit 2023 in the first processing module 202.

Step S606: the second processing unit 2032 in the second processing module 203 processes the USB-like signal received by the second receiving unit 2031 into a second USB signal.

It is noted that, before step S606, the following step may be performed: performing clock and data synchronization on the USB-like signal received by the second receiving unit 2031. This clock and data synchronization step is similar to the steps S702 to S707, detailed description of which is omitted here.

Step S607: the second sending unit 2033 in the second processing module 203 sends the second USB signal produced by the second processing unit 2032 to the second sending/receiving module 204, e.g., according to the method shown in FIG. 8(*a*), i.e., via a USB cable (which includes a pair of differential wires D+ and D− for transmitting the USB signal, a power supply wire VSUPPLY and a ground wire GND);

Step S608: the second sending/receiving module 204 receives the second USB signal sent from the second sending unit 2033 in the second processing module 203.

Generally, High-Speed USB signal transmission, especially long-distance High-Speed USB signal transmission, suffers signal attenuation, which will cause the second USB signal to be different from the first USB signal, affecting the performance of High-Speed USB signal transmission. In order to reduce the attenuation in the transmission of High-Speed USB signals and improve the quality of the transmission of High-Speed USB signals, in Embodiment 3 of the present invention, the following one or more steps may be performed after step S603 and before step S604.

1) increasing the amplitude of the USB-like signal at a data edge of the USB-like signal produced by the first processing unit 2022 in the first processing module 202. Specifically, the amplitude of the USB-like signal may be increased at the transition of a data edge. This is beneficial to correct reception of the second USB signal by the second sending/receiving module.

2) performing equalization on the USB-like signal received by the first receiving unit 2031 in the second processing module 203. In this step, equalization is performed on the signal that suffers attenuation due to long-distance transmission, thereby increasing high-frequency compensation.

In addition, before step S603, the following step may be performed: determining whether the first USB signal received by the first receiving unit 2021 in the first processing module 202 is valid, and performing the subsequent steps if the first USB signal is valid.

The signal transmission method for a USB interface provided by Embodiment 3 of the present invention allows transmission of High-Speed USB signals. The USB signal is converted into a USB-like signal, which is similar to the USB signal; and the USB-like signal is transmitted between the first processing module 202 and the second processing module 203 via a networking cable, thereby eliminating the need to convert the USB signal into a networking-cable signal, and simplifying the processing steps.

The signal transmission method for a USB interface provided by Embodiment 3 of the present invention can achieve long-distance (100 m and longer) transmission of High-Speed USB signals. In addition, the signal transmission method for a USB interface according to Embodiment 3 transmits the squelch signal separately in the networking cable, instead of transmitting it together with the USB signal, which enables long-distance (longer than 100 m) transmission.

It is noted that, the first processing module 202 and the second processing module 203 in Embodiment 3 of the present invention may include the following structures:

an extraction unit, adapted to extract a first clock according to a data edge of the first USB signal;

a sampling unit, adapted to sample, according to the first clock, the first USB signal and the squelch signal received by the first receiving unit 2021 to obtain a processed first USB signal and a processed squelch signal, and send the processed first USB signal and the processed squelch signal;

a first receiving unit, adapted to receive the processed first USB signal and the processed squelch signal, and send the processed first USB signal and the processed squelch signal to a FIFO unit by using the first clock;

a second receiving unit, adapted to receive a second clock sent from a PLL, the second clock having a frequency different from that of the first clock;

a reading unit, adapted to read the processed first USB signal and the processed squelch signal from the FIFO unit by using the second clock;

a sending unit, adapted to send the processed first USB signal and the processed squelch signal read from the FIFO unit; and a third receiving unit, adapted to receive the processed first USB signal and the processed squelch signal read from the FIFO unit, and process the processed first USB signal and the processed squelch signal read from the FIFO unit into a USB-like signal.

Figure 9:
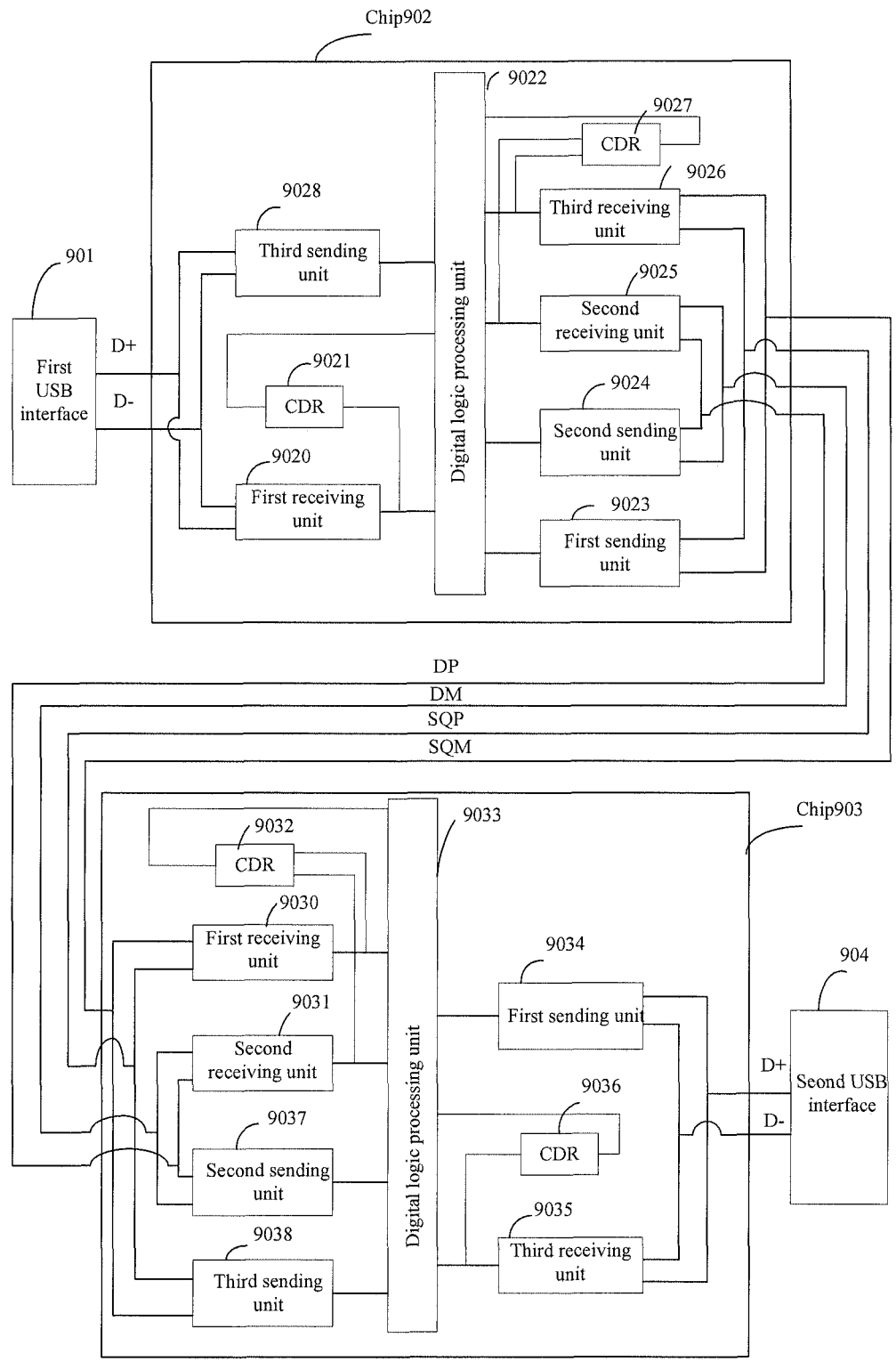

The technical solution of Embodiment 3 of the present invention will be described hereinafter in detail with a specific example. FIG. 9 shows a signal transmission apparatus for a USB interface in the specific example, and the High-Speed USB signal transmission method for a USB interface is described below.

The process of transmitting a High-Speed USB signal from the first USB interface 901 to the second USB interface 904 may include the following steps.

A) the first USB interface 901 sends a first USB signal to the chip 902 via the USB cable. Specifically, the first USB signal may be transmitted via a pair of differential wires D+ and D− in the USB cable. Moreover, the USB cable may further include a power supply wire VSUPPLY and a ground wire GND;

B) the first receiving unit 9020 in the chip 902 receives the first USB signal, and detects the first USB signal (i.e., determines whether the first USB signal is valid) to obtain a squelch signal;

In the embodiment of the present invention, the squelch signal may be obtained from the first USB signal by:

determining the absolute value of the difference between D+ and D− of the first USB signal received by the first receiving unit 9020, and outputting "no squelch" (logic "0") if the absolute value of the difference between D+ and D− is greater than 150 mV; outputting "squelch" (logic "1") if the absolute value of the difference between D+ and D− is less than 100 mV. In the embodiment of the present invention, the squelch signal may be a pulse signal consisting of logic "0"s and logic "1"s. Specifically, this step may be implemented with a comparator.

In this step, the first receiving unit 9020 in the chip 902 may also process the first USB signal into a single-ended signal with full signal swing.

C) the first receiving unit 9020 in the chip 902 sends the valid first USB signal to a Clock and Data Recovery (CDR) unit 9021; the CDR 9021 samples the first USB signal, abstracts a data edge in the first USb signal, abstracts a first clock in the first USB signal according to the data edge, samples according to the first clock the first USB signal (the first USB signal received by the receiving module) and the squelch signal to obtain the processed first USB signal and the processed squelch signal, and sends the processed first USB signal and the processed squelch signal;

D) the digital logic processing unit 9022 receives the processed first USB signal and the processed squelch signal, and sends the processed first USB signal and the processed squelch signal to a FIFO unit by using the first clock; the digital logic processing unit 9022 receives a second clock sent from a PLL (not shown in the figure, the PLL may be arranged in the chip 902), the second clock having a frequency different from that of the first clock; the processed first USB signal and the processed squelch signal are read from the FIFO unit (not shown in the figure, the FIFO unit may be arranged in the digital logic processing unit 9022) by using a second clock; and the processed first USB signal and the processed squelch signal read from the FIFO unit are sent;

When a High-Speed USB signal is transmitted using a USB networking cable, amplitude attenuation may occur to the USB signal, and if the amplitude is reduced to a low level, the squelch signal detected by the USB signal receiving terminal (e.g., the second USB interface 904) may not be accurate, and valid data may be wrongly identified as invalid data, thus breaking transmission of the signal. In step D), the amplitude of the USB-like signal is increased before the USB-like signal is transmitted via the networking cable, thereby preventing the amplitude from being reduced to a low level, and ensuring the accuracy of data received by the USB-like signal receiving terminal.

E) the first sending unit 9023 in the chip 902 receives the processed squelch signal read from the FIFO unit; the second sending unit 9024 in the chip 902 receives the processed first USB signal read from the FIFO unit and processes the first USB signal into a USB-like signal; the first sending unit 9023 in the chip 902 sends the squelch signal to the chip 903; the second sending unit 9024 in the chip 902 sends the USB-like signal (i.e., data) to the chip 903. Specifically, the USB-like signal may be transmitted using two pairs of wires (DP and DM, and SQP and SQM) in the networking cables, and the SQP and SQM pair is mainly used to transmit the squelch signal.

Furthermore, an amplitude increasing (pre-emphasis) unit may be added to the second sending unit 9024 in the chip 902. The amplitude increasing unit increases the amplitude of data at the transition of a data edge, which is beneficial to data reception at the receiving terminal for the USB-like signal.

In addition, the High-Speed signal obtained from the digital logic processing unit may be a 4-bit parallel full-swing signal, and the second sending unit 9024 in the chip 902 may convert the 4-bit parallel data into serial data and then send it in the form of a USB-like signal.

F) the first receiving unit 9030 in the chip 903 receives the squelch signal sent from the first sending unit in the chip 902, and the second receiving unit 9031 in the chip 903 receives the USB-like signal sent from the second sending unit 9024 in the chip 902;

The first receiving unit 9030 receives the squelch signal transmitted via a networking cable (e.g., SQP and SQM shown in FIG. 9); and the second receiving unit 9031 receives the USB-like signal transmitted via the networking cable (e.g., DP and DM shown in FIG. 9).

In addition, after the second receiving unit 9031 in the chip 903 receives the USB-like signal sent from the second sending unit 9024 in the chip 902, equalization may be performed on the USB-like signal. Equalization on the signal that suffers attenuation due to long-distance transmission can increase high-frequency compensation and ensure the accuracy of the received signal.

G) the first receiving unit 9030 and the second receiving unit 9031 in the chip 903 send the received squelch signal and the received USB-like signal to the CDR 9032 for clock and data recovery;

G1) the CDR 9032 samples the received USB-like signal to abstract a data edge in the USB-like signal, abstracts a third clock from the USB-like data according to the data edge, samples the USB-like signal and the squelch signal according to the third clock to obtain a processed USB-like signal and a processed squelch signal, and sends the processed USB-like signal and the processed squelch signal to the digital logic processing unit 9033;

G2) the digital logic processing unit 9033 receives the processed USB-like signal and the processed squelch signal, and sends the processed USB-like signal and the processed squelch signal to a FIFO unit by using the third clock; the digital logic processing unit 9033 receives a fourth clock sent from a PLL (not shown in the figure, the PLL may be arranged in the chip 903), the fourth clock having a frequency different from that of the third clock, reads the processed USB-like signal and the processed squelch signal from the FIFO unit by using the fourth clock (not shown in the figure, the FIFO unit may be arranged in the digital logic processing unit 9033), and sends the processed USB-like signal and the processed squelch signal read from the FIFO unit to the first sending unit 9034 in the chip 903.

When a High-Speed USB signal is transmitted using a USB networking cable, amplitude attenuation may occur to the USB signal, and if the amplitude is reduced to a low level, the squelch signal detected by a squelch detecting module of the USB signal receiving terminal (e.g., the second USB interface 904) may not be wrong, and valid data may be wrongly identified as invalid data, thus breaking transmission of the signal. In this step, the amplitude of the USB-like signal is increased before it is transmitted, thereby preventing the amplitude from being reduced to a low level, and ensuring the accuracy of data received by the USB signal receiving terminal.

The first sending unit 9034 in the chip 903 receives the squelch signal and the USB-like signal sent from the digital logic processing unit 9033, and processes the squelch signal and the USB-like signal into a second USB signal.

I) the first sending unit 9034 in the chip 903 transmits the second USB signal to the second USB interface 904, using a USB cable in this case;

J) the second USB interface 904 receives the second USB signal sent from the first sending unit 9034 in the chip 903. This concludes transmission of the High-Speed USB signal.

In this specific example, the squelch signal is extracted from the data to be transmitted separately (i.e., using a pair of differential wires SQP and SQM), and long-distance transmission of the USB signal is achieved in a way where the USB signal and the squelch signal are transmitted simultaneously. According to this transmission method, the squelch signal can be detected correctly by the squelch detecting unit at the USB signal receiving terminal (e.g., the chip 903 shown in FIG. 9) after the High-Speed USB signal undergoes long-distance transmission, thereby achieving correct determination of the validity of data.

The above steps A) to J) are the case where the USB signal is transmitted from the first USB interface 901 to the second USB interface 904. It is noted that, the USB signal may also be transmitted from the second USB interface 904 to the first USB interface 901, i.e., sequentially through the second USB interface 904, the third receiving unit 9035 in the chip 903, the CDR 9036 in the chip 903, the digital logic processing unit 9033 in the chip 903, the second sending unit 9037 and the third sending unit 9038 in the chip 903, the second receiving unit 9025 and the third receiving unit 9026 in the chip 902, the CDR 9027 in the chip 902, the digital logic processing unit 9022 in the chip 902, the third sending unit 9028 in the chip 902, and the first USB interface 901. The transmission in this case is similar to the steps A) to J), detailed description of which is omitted here.

Preferred embodiments of the present invention are described above. It is noted that, various alternations and modifications can be made by those skilled in the art without deviation from the principle of the present invention, and these alternations and modifications shall fall within the scope of protection of the present invention.

The invention claimed is:

1. A signal transmission method for a USB interface, comprising:
    receiving a first USB signal sent from a sending terminal, obtaining a squelch signal according to the first USB signal, processing the first USB signal into a USB-like signal, and transmitting the USB-like signal via a networking cable; and
    receiving the USB-like signal, processing the USB-like signal into a second USB signal, and sending the second USB signal to a receiving terminal, wherein the USB-like signal is a pair of differential signals that meets a USB transmission protocol, does not meet USB signal electrical specifications, and has a signal swing different from those of the first USB signal and the second USB signal,
    wherein the processing the first USB signal into a USB-like signal comprises:
        abstracting a first clock according to a data edge of the first USB signal;
        sampling the first USB signal and the squelch signal according to the first clock to obtain a processed first USB signal and a processed squelch signal, and sending the processed first USB signal and the processed squelch signal;
        receiving the processed first USB signal and the processed squelch signal, and sending the processed first USB signal and the processed squelch signal to a first-in first-out (FIFO) unit by using the first clock;
        receiving a second clock sent from a phase-locked loop (PLL), the second clock having a frequency different from that of the first clock;
        reading the processed first USB signal and the processed squelch signal from the FIFO unit by using the second clock;
        sending the processed first USB signal and the processed squelch signal read from the FIFO unit; and
        receiving the processed first USB signal and the processed squelch signal read from the FIFO unit, and processing the processed first USB signal and the processed squelch signal read from the FIFO unit into the USB-like signal.

2. The signal transmission method according to claim 1, wherein, the transmitting the USB-like signal via a networking cable comprises: transmitting the USB-like signal by a pair of wires in the networking cable, with at least one of the rest of wires in the networking cable used for ground.

3. The signal transmission method according to claim 2, wherein, the method further comprises: using at least one of the rest of wires in the networking cable for power supply.

4. The signal transmission method according to claim 1, wherein, before the processing the first USB signal into a USB-like signal, the method further comprises:
    the transmitting the USB-like signal via a networking cable comprises: transmitting the USB-like signal by a first pair of wires in the networking cable, and transmitting the squelch signal by a second pair of wires in the networking cable, with at least one of the rest of wires in the networking cable used for ground.

5. The signal transmission method according to claim 4, wherein, the method further comprises:
    using at least one of the rest of wires in the networking cable for power supply.

6. The signal transmission method according to claim 4, wherein, the method further comprises:
    transmitting a control signal by at least one of the rest of wires in the networking cable.

7. The signal transmission method according to claim 4, wherein, before the transmitting the USB-like signal via a networking cable, the method further comprises: increasing the amplitude of the USB-like signal at a data edge of the USB-like signal.

8. The signal transmission method according to claim 4, wherein, while receiving the USB-like signal, the method further comprises: performing equalization on the USB-like signal.

9. A signal transmission apparatus for a USB interface, comprising:
    a first processing module, adapted to receive a first USB signal sent from a sending terminal, obtain a squelch signal according to the first USB signal, process the first USB signal into a USB-like signal, and transmit the USB-like signal via a networking cable; and
    a second processing module, adapted to receive the USB-like signal, process the USB-like signal into a second USB signal, and send the second USB signal to a receiving terminal, wherein the USB-like signal is a pair of differential signals that meets a USB transmission protocol, does not meet USB signal electrical specifications, and has a signal swing different from those of the first USB signal and the second USB signal,
    wherein the first processing module comprises:
        an extraction unit, adapted to extract a first clock according to a data edge of the first USB signal;
        a sampling unit, adapted to sample the first USB signal and the squelch signal according to the first clock to obtain a processed first USB signal and a processed squelch signal, and send the processed first USB signal and the processed squelch signal;
        a first receiving unit, adapted to receive the processed first USB signal and the processed squelch signal, and send the processed first USB signal and the processed squelch signal to a FIFO unit by using the first clock;
        a second receiving unit, adapted to receive a second clock sent from a PLL, the second clock having a frequency different from that of the first clock;
        a reading unit, adapted to read the processed first USB signal and the processed squelch signal from the FIFO unit by using the second clock;
        a sending unit, adapted to send the processed first USB signal and the processed squelch signal read from the FIFO unit; and a third receiving unit, adapted to receive the processed first USB signal and the processed squelch signal read from the FIFO unit, and process the processed first USB signal and the processed squelch signal read from the FIFO unit into the USB-like signal.

10. The signal transmission apparatus according to claim 9, wherein, the first processing module is adapted to transmit the USB-like signal by a pair of wires in the networking cable, with at least one of the rest of wires in the networking cable used for ground.

11. The signal transmission apparatus according to claim 9, wherein, the first processing module is further adapted to use at least one of the rest of wires in the networking cable for power supply.

12. The signal transmission apparatus according to claim 9, wherein the first processing module is adapted to: transmit the USB-like signal by a first pair of wires in the networking cable, and transmit the squelch signal by a second pair of wires in the networking cable, with at least one of the rest of wires in the networking cable used for ground.

13. The signal transmission apparatus according to claim 12, wherein, the first processing module is further adapted to use at least one of the rest of wires in the networking cable for power supply.

14. The signal transmission apparatus according to claim 12, wherein, the first processing module is further adapted to transmit a control signal by at least one of the rest of wires in the networking cable.

15. The signal transmission apparatus according to claim 13, wherein, the first processing module further comprises:

an amplitude increasing unit, adapted to increase the amplitude of the USB-like signal at a data edge of the USB-like signal.

16. The signal transmission apparatus according to claim 13, wherein, the second processing module further comprises:

an equalization unit, adapted to perform equalization on the USB-like signal.

17. The signal transmission apparatus according to claim 13, wherein, the first processing module is further adapted to transmit a control signal by at least one of the rest of wires in the networking cable.

\* \* \* \* \*